(12) United States Patent
Jhaveri et al.

(10) Patent No.: US 9,365,731 B2
(45) Date of Patent: Jun. 14, 2016

(54) WATER-BASED POLYMER COMPOSITIONS FOR PRINTING INKS AND COATINGS

(71) Applicant: BASF SE, Ludwigshafen (DE)

(72) Inventors: Sarav Bharat Jhaveri, Lincoln Park, MI (US); Chien Lu Hsu, Grosse Ile, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/403,382

(22) PCT Filed: May 23, 2013

(86) PCT No.: PCT/US2013/042472
§ 371 (c)(1),
(2) Date: Nov. 24, 2014

(87) PCT Pub. No.: WO2013/181068
PCT Pub. Date: Dec. 5, 2013

(65) Prior Publication Data
US 2015/0166803 A1 Jun. 18, 2015

Related U.S. Application Data

(60) Provisional application No. 61/652,660, filed on May 29, 2012.

(51) Int. Cl.
| | |
|---|---|
| *C09D 11/107* | (2014.01) |
| *C08F 265/06* | (2006.01) |
| *C09D 11/106* | (2014.01) |
| *C09D 151/00* | (2006.01) |
| *C09D 11/03* | (2014.01) |

(Continued)

(52) U.S. Cl.
CPC ............ *C09D 11/107* (2013.01); *C08F 265/06* (2013.01); *C09D 11/03* (2013.01); *C09D 11/10* (2013.01); *C09D 11/102* (2013.01); *C09D 11/106* (2013.01); *C09D 151/003* (2013.01); *C08F 216/36* (2013.01); *C08F 220/06* (2013.01); *C08K 5/24* (2013.01); *C08K 5/25* (2013.01); *C08K 5/29* (2013.01)

(58) Field of Classification Search
None
See application file for complete search history.

(56) References Cited

U.S. PATENT DOCUMENTS

| | | | |
|---|---|---|---|
| 4,820,762 A | 4/1989 | Tsaur | |
| 5,688,875 A * | 11/1997 | Sasaki | ................... C07C 267/00 252/182.2 |

(Continued)

FOREIGN PATENT DOCUMENTS

| | | |
|---|---|---|
| CN | 102395633 A | 3/2012 |
| WO | WO-01/38412 A1 | 5/2001 |
| WO | WO-2010/118836 A2 | 10/2010 |

OTHER PUBLICATIONS

International Preliminary Report on Patentability received in PCT/US2013/042472 mailed Dec. 11, 2014, 10 pages.

(Continued)

*Primary Examiner* — Satya Sastri
(74) *Attorney, Agent, or Firm* — Foley & Lardner LLP

(57) ABSTRACT

A water-based coating composition including a continuous phase comprising water and a carboxylic acid-functional support polymer, a polycarbodiimide, an ketofunctionalized latex polymer, and a dihydrazide, and wherein the water-based coating composition undergoes a less than 25% increase in viscosity after 5 days of storage in a closed container under ambient conditions.

17 Claims, 2 Drawing Sheets

(51) Int. Cl.
*C09D 11/10* (2014.01)
*C09D 11/102* (2014.01)
C08F 216/36 (2006.01)
C08K 5/29 (2006.01)
C08F 220/06 (2006.01)
C08K 5/25 (2006.01)
C08K 5/24 (2006.01)

(56) References Cited

U.S. PATENT DOCUMENTS

| | | | |
|---|---|---|---|
| 6,239,209 | B1 | 5/2001 | Yang et al. |
| 6,515,042 | B2 | 2/2003 | Kriessmann et al. |
| 6,610,784 | B1 | 8/2003 | Overbeek et al. |
| 6,617,267 | B2 | 9/2003 | Soane et al. |
| 6,727,314 | B2 | 4/2004 | Burghart et al. |
| 6,848,777 | B2 | 2/2005 | Chen et al. |
| 6,869,996 | B1 | 3/2005 | Krajnik et al. |
| 6,872,789 | B2 | 3/2005 | Brinkhuis et al. |
| 6,992,121 | B1 | 1/2006 | Peters et al. |
| 7,282,531 | B2 * | 10/2007 | Miyai ............... C08K 5/17 524/413 |
| 7,285,590 | B2 | 10/2007 | Holub et al. |
| 7,569,636 | B2 | 8/2009 | Tennebroek et al. |
| 7,923,503 | B2 | 4/2011 | Takahashi et al. |
| 7,947,760 | B2 | 5/2011 | Janmaat et al. |
| 8,003,568 | B2 | 8/2011 | Matsunaga et al. |
| 8,013,092 | B1 | 9/2011 | Krajnik et al. |
| 2003/0055171 | A1 * | 3/2003 | Overbeek ........... C08G 18/0823 525/192 |
| 2004/0125184 | A1 | 7/2004 | Sharma et al. |
| 2006/0063868 | A1 * | 3/2006 | Janmaat ............... C08F 257/02 524/160 |
| 2006/0089464 | A1 | 4/2006 | Uwada et al. |
| 2007/0148444 | A1 * | 6/2007 | Kamiya ............... C08F 220/18 428/355 AC |
| 2007/0244238 | A1 | 10/2007 | Desor et al. |
| 2008/0033096 | A1 * | 2/2008 | Takahashi ........... C09J 133/14 524/460 |
| 2009/0156721 | A1 | 6/2009 | Lee et al. |
| 2011/0021679 | A1 | 1/2011 | Takahashi et al. |
| 2011/0101543 | A1 | 5/2011 | Hayashi et al. |
| 2011/0217471 | A1 | 9/2011 | Schwendeman et al. |
| 2012/0026238 | A1 | 2/2012 | Ganapathiappan et al. |
| 2012/0140008 | A1 | 6/2012 | Ganapathiappan et al. |
| 2012/0152459 | A1 | 6/2012 | Avramidis |

OTHER PUBLICATIONS

International Search Report and Written Opinion of the International Searching Authority issued in PCT/US2013/042472 mailed Nov. 22, 2013, 11 pages.
Extended Search Report received for European Patent Application No. 13797073.7 issued Oct. 7, 2015, 6 pages.
First Office Action received for Chinese Patent Application No. 201380027630.1 issued Sep. 22, 2015, 21 pages with English translation.

* cited by examiner

WATER-BASED POLYMER COMPOSITIONS FOR PRINTING INKS AND COATINGS

CROSS-REFERENCE TO RELATED APPLICATIONS

This application is the U.S. National Stage of International Application No. PCT/US2013/042472, with international filing date May 23, 2013, which claims the benefit of and priority to U.S. Provisional Application No. 61/652,660 filed May 29, 2012, the contents of which are incorporated herein by reference in their entireties.

FIELD

The present technology generally relates to water-based polymer compositions for use in inks and coatings.

SUMMARY

In one aspect, a water-based composition includes a continuous phase comprising water and a carboxylic acid-functional support polymer; a polycarbodiimide; a keto-functional latex polymer; and a dihydrazide. In some embodiments, the water-based composition undergoes less than a 20% increase in viscosity after 5 days of storage in a closed container under ambient conditions. In some embodiments, the carboxylic acid-functional support polymer is an alkali soluble resin. In one embodiment, the carboxylic acid-functional support polymer is a co-polymer including styrene, methyl methacrylate, butyl acrylate and acrylic acid. In some embodiments, the carboxylic acid-functional support polymer has a number average molecular weight of about 500 to 100,000 g/mole, from 1,000 to 20,000 g/mol, or from 500 to 6,000 g/mol. Any of the compositions described herein may be a clear coating or a pigmented coating such as an ink. In some embodiments, the compositions are inks.

In any of the above embodiments, the keto-functional latex polymer includes acrolein, methacrolein, formylstyrene, a compound having a (meth)acryloyl group and a keto group (e.g., acetyl group) in the molecule, or a vinyl alkyl ketone. For example, the keto-functional latex polymer may include diacetone acrylamide, diacetone methacrylamide, diacetone acrylate, diacetone methacrylate, acetoacetoxymethyl(meth)acrylate, 2-(acetoacetoxy)ethyl(meth)acrylate, 2-acetoacetoxypropyl(meth)acrylate, butanediol-1,4-acrylate-acetylacetate, vinyl methyl ketone, vinyl ethyl ketone, and vinyl isobutyl ketone, allyl acetoacetate, vinyl acetoacetate, or vinyl acetoacetamide.

In any of the above embodiments, the keto-functionalized latex polymer may include diacetone acrylamide. In any of the above embodiments, the dihydrazide is a compound of Formula I:

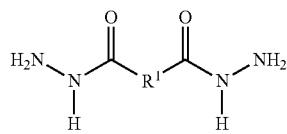

wherein $R^1$ is alkylene, cycloalkylene, arylene, alkylenearylene, alkylenearylalkylene, heterocyclylene, alkyleneheterocyclylene, alkyleneheterocyclylalkylene, heteroarylene, alkyleneheteroarylene, or alkyleneheteroarylalkylene. In various embodiments, $R^1$ is alkyl. In such embodiments, $R^1$ may be a $C_1$-$C_{20}$ alkyl. In one embodiment, the dihydrazide is adipic dihydrazide.

In any of the above embodiments, the polycarbodiimide is a compound of Formula:

wherein: $R^2$ is alkylenyl, arylenyl, aralkylenyl, heteroarylenyl, heteroarylalkylenyl, heterocyclylenyl, or heterocylylalkylenyl. In some embodiments, $R^2$ is $C_1$-$C_{20}$ alkylenyl, benzylenyl, phenylenyl, or perhalophenylenyl. In some embodiments, $R^2$ is a $C_1$-$C_{10}$ alkylenyl or $C_1$-$C_{20}$ cyloalkylalkylenyl. In some embodiments, $R^2$ is 2,2,4-trimethylhexamethylene;

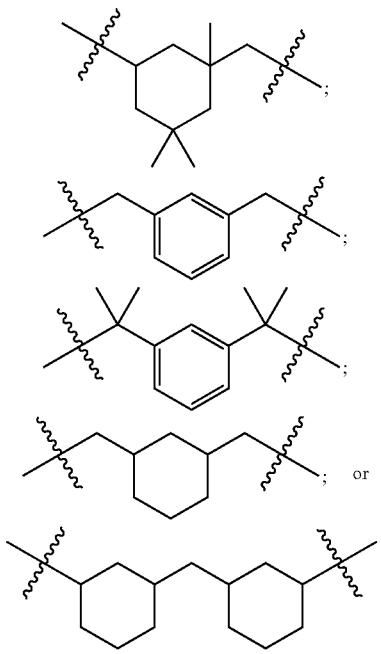

In another aspect, a process for preparing a water-based composition includes mixing a polycarbodiimide with a cross-linkable polymer supported emulsion; wherein: the cross-linkable polymer supported emulsion is prepared by a process including charging a neutralized carboxylic acid-functional support polymer dissolved in water to a reactor; charging monomers comprising a keto-functional monomer to the reactor; charging at least one initiator to the reactor; agitating the neutralized carboxylic acid-functional support polymer, the monomers and at least one initiator at a temperature and for a time period sufficient to prepare the cross-linkable polymer supported emulsion. The process may further include mixing a pigment with the cross-linkable polymer supported emulsion. According to some embodiments, the pigment is mixed as pigment dispersion. The process may further include mixing a dihydrazide with the cross-linkable polymer supported emulsion. Any of the above processes may further include applying the water-based composition to a substrate and removing the water to form a coated substrate.

In another aspect, a substrate coated with an coating formed from a coating composition is provided. The coating composition includes a cross-linkable keto-functionalized latex polymer and a cross-linkable water-soluble support resin; where the substrate coated with the coating exhibits a Sutherland rub test score of 4 or greater; the Sutherland rub test includes rubbing the substrate coated with the coating with a Grade 5 bleach cloth and a 2 lb weight, for 15 cycles at a speed of #1, in the presence of Windex® on the coating; and the substrate includes polyethylene. In some embodiments, the coating is an ink. In some embodiments, the coating exhibits a Sutherland rub test score of 5.

In another aspect, a method of printing an ink onto a substrate is provided, wherein the ink includes a cross-linkable keto-functionalized latex polymer and a cross-linkable water-soluble support resin, and the ink exhibits a resolubility of less than 100 prints. In some embodiments, the ink exhibits a resolubility of less than 30 prints. In some embodiment, the ink exhibits a resolubility of from 20 to 50 prints.

DETAILED DESCRIPTION

Figure 1:
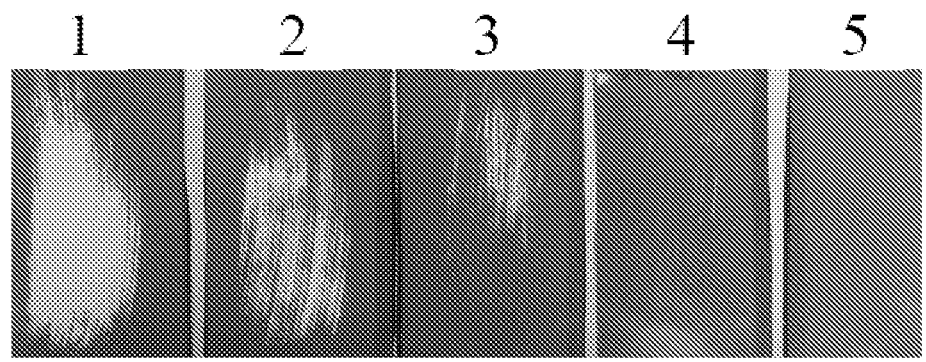
FIG. 1 is a series of the five photographs (A, B, C, D and E) of printed inks illustrating the various levels of the Sutherland rub testing from 1 to 5, respectively.

The illustrative embodiments described herein and in the claims are not meant to be limiting. Other embodiments may be utilized, and other changes may be made, without departing from the spirit or scope of the subject matter presented here. The present technology is also illustrated by the examples herein, which should not be construed as limiting in any way.

As used herein, the following definitions of terms shall apply unless otherwise indicated.

In general, "substituted" refers to a group, as defined below (e.g., an alkyl or aryl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, carbonyls(oxo), carboxyls, esters, urethanes, thiols, sulfides, sulfoxides, sulfones, sulfonyls, sulfonamides, amines, isocyanates, isothiocyanates, cyanates, thiocyanates, nitro groups, nitriles (i.e., CN), and the like.

Alkyl groups include straight chain and branched alkyl groups having from 1 to 20 carbon atoms or, in some embodiments, from 1 to 12, 1 to 8, 1 to 6, or 1 to 4 carbon atoms. Alkyl groups further include cycloalkyl groups. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above. Where the term haloalkyl is used, the alkyl group is substituted with one or more halogen atoms.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Cycloalkyl groups further include mono-, bicyclic and polycyclic ring systems, such as, for example bridged cycloalkyl groups as described below, and fused rings, such as, but not limited to, decalinyl, and the like. In some embodiments, polycyclic cycloalkyl groups have three rings. Substituted cycloalkyl groups may be substituted one or more times with, non-hydrogen and non-carbon groups as defined above. However, substituted cycloalkyl groups also include rings that are substituted with straight or branched chain alkyl groups as defined above. Representative substituted cycloalkyl groups may be mono-substituted or substituted more than once, such as, but not limited to, 2,2-, 2,3-, 2,4- 2,5- or 2,6-disubstituted cyclohexyl groups, which may be substituted with substituents such as those listed above.

Alkenyl groups include straight and branched chain and cycloalkyl groups as defined above, except that at least one double bond exists between two carbon atoms. Thus, alkenyl groups have from 2 to about 20 carbon atoms, and typically from 2 to 12 carbons or, in some embodiments, from 2 to 8, 2 to 6, or 2 to 4 carbon atoms. In some embodiments, alkenyl groups include cycloalkenyl groups having from 4 to 20 carbon atoms, 5 to 20 carbon atoms, 5 to 10 carbon atoms, or even 5, 6, 7, or 8 carbon atoms. Examples include, but are not limited to vinyl, allyl, $CH=CH(CH_3)$, $CH=C(CH_3)_2$, $-C(CH_3)=CH_2$, $-C(CH_3)=CH(CH_3)$, $-C(CH_2CH_3)=CH_2$, cyclohexenyl, cyclopentenyl, cyclohexadienyl, butadienyl, pentadienyl, and hexadienyl, among others. Representative substituted alkenyl groups may be mono-substituted or substituted more than once, such as, but not limited to, mono-, di- or tri-substituted with substituents such as those listed above.

Alkynyl groups include straight and branched chain alkyl groups, except that at least one triple bond exists between two carbon atoms. Thus, alkynyl groups have from 2 to about 20 carbon atoms, and typically from 2 to 12 carbons or, in some embodiments, from 2 to 8, 2 to 6, or 2 to 4 carbon atoms. Examples include, but are not limited to $-C\equiv CH$, $-C\equiv C(CH_3)$, $-C\equiv C(CH_2CH_3)$, $-CH_2C\equiv CH$, $-CH_2C\equiv C(CH_3)$, and $-CH_2C\equiv C(CH_2CH_3)$, among others. Representative substituted alkynyl groups may be mono-substituted or substituted more than once, such as, but not limited to, mono-, di- or tri-substituted with substituents such as those listed above.

Aryl, or arene, groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above.

As used herein, the groups such as alkylenyl, arylenyl, aralkylenyl, refer to groups having two points of attachment. An alkylenyl, refers to an alkyl group having two points of attachment. For example, alkylenyl groups may include, but are not limited to methylene (—$CH_2$—), butylene (—$CH_2CH_2CH_2CH_2$—; —$CH_2CH(CH_3)CH_2$—; —CH($CH_3CH_2$)$CH_2$—), and the like for other alkyl-based groups. An arylenyl is an aryl group having two points of attachment. For example, one such group is a —$C_6H_4$— group. An aralkylenyl group is an aryl group with an alkylene group. For example, one such group is —$C_6H_4CH_2$—. The meanings of the other groups are similarly intended.

"Alkoxy" refers to the group —O-alkyl wherein alkyl is defined herein. Alkoxy includes, by way of example, methoxy, ethoxy, n-propoxy, isopropoxy, n-butoxy, t-butoxy, sec-butoxy, and n-pentoxy.

In general, a dual cross-linking system for water-based emulsions is provided. The system finds application in inks and coatings and provides improved chemical resistance properties over previous systems. In the dual cross-linking system, a diacetone acrylamide (DAAM) functionalized latex is cross-linked via the addition of adipic dihydrazide (ADH), in the presence of a support resin having acid functionality which is cross-linked with polycarbodiimide (PCDI). The support resin may be a styrene-(meth)acrylate-(meth)acrylic acid co-polymer that is neutralized with a base to form a water-soluble polymer solution. The water-soluble carboxylic acid-functional polymer solution is then added during the emulsion process primarily as a polymeric surfactant to provide stability to the system. Hence there are two cross-linking chemistries occurring in the system, the DAAM-ADH chemistry which cross-links the latex particles, and the PCDI-acid chemistry that cross-links the acid-functional polymeric surfactant. The system allows inter- and intra-particle cross-linking simultaneously, and more efficient than each individual cross-linking systems. Additionally, the kinetics of each individual cross-linking system are different, leading to tunable curing and drying times for inks and coatings.

As used herein, the term (meth)acrylic monomer refers to acrylic or methacrylic acid, esters of acrylic or methacrylic acid, and salts, amides, and other suitable derivatives of acrylic or methacrylic acid, and mixtures thereof. Examples of suitable acrylic monomers include, without limitation, the following methacrylate esters: methyl methacrylate, ethyl methacrylate, n-propyl methacrylate, n-butyl methacrylate (BMA), isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate (GMA), benzyl methacrylate, allyl methacrylate, 2-n-butoxyethyl methacrylate, 2-chloroethyl methacrylate, sec-butyl-methacrylate, tert-butyl methacrylate, 2-ethylbutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octyl-methacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate. Example of suitable acrylate esters include, without limitation, methyl acrylate, ethyl acrylate, n-propyl acrylate, isopropyl acrylate, n-butyl acrylate (BA), n-decyl acrylate, isobutyl acrylate, n-amyl acrylate, n-hexyl acrylate, isoamyl acrylate, 2-hydroxyethyl acrylate, 2-hydroxypropyl acrylate, N,N-dimethylaminoethyl acrylate, N,N-diethylaminoethyl acrylate, t-butylaminoethyl acrylate, 2-sulfoethyl acrylate, trifluoroethyl acrylate, glycidyl acrylate, benzyl acrylate, allyl acrylate, 2-n-butoxyethyl acrylate, 2-chloroethyl acrylate, sec-butyl-acrylate, tert-butyl acrylate, 2-ethylbutyl acrylate, cinnamyl acrylate, crotyl acrylate, cyclohexyl acrylate, cyclopentyl acrylate, 2-ethoxyethyl acrylate, furfuryl acrylate, hexafluoroisopropyl acrylate, methallyl acrylate, 3-methoxybutyl acrylate, 2-methoxybutyl acrylate, 2-nitro-2-methylpropyl acrylate, n-octylacrylate, 2-ethylhexyl acrylate, 2-phenoxyethyl acrylate, 2-phenylethyl acrylate, phenyl acrylate, propargyl acrylate, tetrahydrofurfuryl acrylate and tetrahydropyranyl acrylate.

A dual cure coating system is provided. The dual cure system includes a combination of a water-based keto-functional polymer supported emulsion and a dihydrazide; and a carboxylic acid-functional support polymer and a polycarbodiimide solution. In the system, the coating is prepared by mixing the water-based keto-functional polymer and the carboxylic acid-functional support polymer, followed by addition of the polycarbodiimide and dihydrazide solutions to make the coating composition. Where the coating is an ink, a water-based pigment dispersion may be added to the keto-functional polymer supported emulsion, or to the keto-functional polymer/polycarbodiimide mixture. The coating is then applied to a substrate as a film, and the film is allowed to cure at room temperature or elevated temperatures. The dual cure inks and coatings exhibit excellent resistance properties at economical cost, and they exhibit good resolubility characteristics on press. The coatings and inks described are useful in flexographic and gravure printing operations, and are particularly suited to printing on flexible packaging.

Without being bound by theory, it is believed that the water-based emulsion, which includes an keto-functionalized latex and an acid-functional protective colloid, reacts with a dihydrazide component to cross-link the keto-groups of the latex, while the protective colloid is cross-linked with the polycarbodiimide. In one illustrative embodiment, a water-based emulsion, which includes a diacetone-acrylamide (DAAM)-functionalized latex and an acid-functional protective colloid, reacts with adipic dihydrazide (ADH) at room temperature for the DAAM-ADH cross-linking to occur. A polycarbodiimide (PCDI) is then added to cross-link the acid groups of the protective colloid. The dual cross-linking system allows simultaneous inter-particle and intra-particle cross-linking, and hence works more efficiently than each individual crosslinking system. The dual cross-linking system may be used for crosslinking of high chemical performance water-based coatings and inks, which exhibit excellent rub-resistance and spot-resistance to water and basic solutions such as ammonia, Windex® cleaning solution, ethanol, and the like. The prints also have excellent ice crinkle resistance and alkali resistance.

Dispersions prepared using the above emulsions require relatively low amounts of cross-linkers (polycarbodiimides) to form resistant inks and coatings for various substrates including polymeric films. Inks containing the emulsions may be used as protective colloids to provide good press resolubility. The ink resistance properties match those of two-pack polyaziridine cross-linking systems, but without use of highly toxic polyaziridines.

In one aspect, emulsions are provided as part of the dual cross-linking system described above. The emulsions may include a continuous phase including water and a carboxylic acid-functional support polymer; a polycarbodiimide; and a keto-functionalized latex polymer. The emulsions are prepared by charging a neutralized carboxylic acid-functional support polymer dissolved in water to a reactor (e.g. the first vessel). From a second vessel, a solution of a (meth)acrylate monomer and a styrenic monomer are also charged to the reactor. From a third vessel, an aqueous acrylamide solution is also charged to the reactor. The mixture of the reactants is then agitated at a temperature and for a time sufficient for the reactants to combine and form a polymer supported emulsion. As used herein, the vessels may be feed lines to the main reactor, where the ingredients in each of the vessels is mixing in-line prior to entering the reactor. Alternatively, instead of adding the acrylamide solution from a third vessel during the reaction, the acrylamide may be added to the initial charge of the reactor with the neutralized carboxylic acid-functional support polymer, or the acrylamide may be added after the emulsion is prepared. After the preparation of the polymer supported emulsion, either at the reaction temperature or after cooling, a dihydrazide and a base are added to the emulsion prior to application to a substrate.

In the reaction, the (meth)acrylate monomer(s) forms a keto-functional latex polymer emulsion with the styrenic monomer. The dihydrazide then reacts with the keto groups of the keto-functional latex polymer in a cross-linking fashion to cure the emulsion/coating on a substrate. Accordingly, that is the first of the dual cross-links (see Scheme 1 below, illustrating what is believed to be the reaction pathway to such a cross-linking reaction). The second cross-link is the reaction of the polycarbodiimide with the residual acid groups on the carboxylic acid-functional support polymer (see Scheme 2 below, illustrating what is believed to be the reaction pathway to polycarbodiimide cross-linking). The addition of the polycarbodiimide may be performed in conjunction to, or after incorporation of a pigment into the emulsion to prepare an ink, if an ink is prepared.

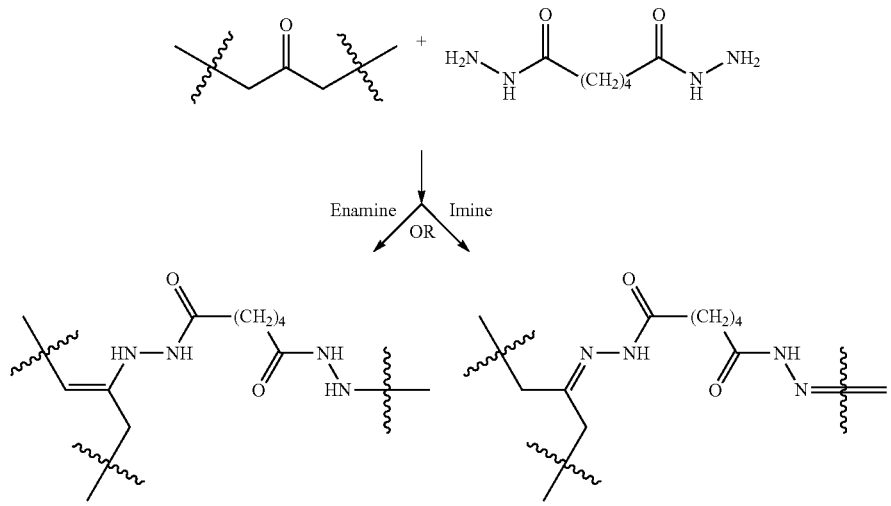

Scheme 1

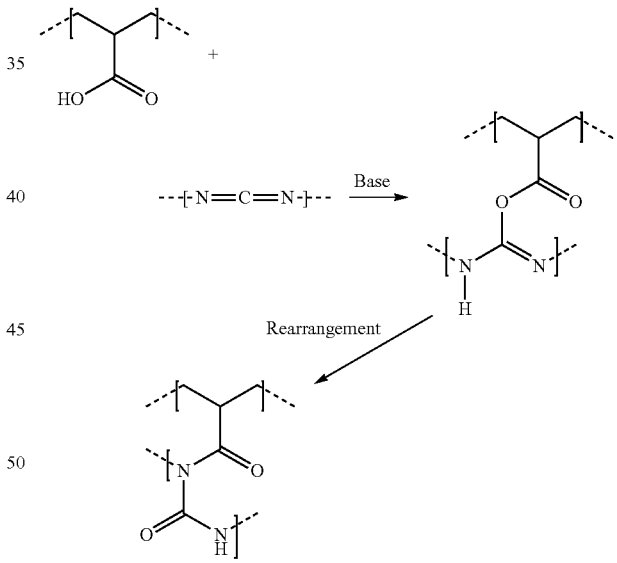

Scheme 2

Accordingly, with both keto-functionality (Scheme 1) and carboxylic acid functionality (Scheme 2) in the polymers, a dual cross-linking system may be achieved to provide coatings and inks with excellent resistance properties and good resolubility characteristics, particularly with regard to flexible substrate applications.

When prepared as a coating or ink, the emulsions may include an initiator to assist in curing of the emulsion into a cured and dried coating or ink. Such initiators may include those that are water-soluble for ready mixing and blending with the emulsions. The initiator may be a thermal initiator. Suitable initiators include, but are not limited to 2,2'-azodi- (2,4-dimethylvaleronitrile); 2,2'-azobisisobutyronitrile (AIBN); 2,2'-azobis(2-methylbutyronitrile); 1,1'-azobis(cyclohexane-1-carbonitrile); tertiary butylperbenzoate; tert-amyl peroxy 2-ethylhexyl carbonate; 1,1-bis(tert-amylperoxy)cyclohexane, tert-amylperoxy-2-ethylhexanoate, tert-amylperoxyacetate, tert-butylperoxyacetate, tert-butylperoxybenzoate (TBPB), 2,5-di-(tert-butylperoxy)-2,5-dimethylhexane, di-tert-amyl peroxide (DTAP); di-tert-butylperoxide (DTBP); lauryl peroxide; dilauryl peroxide (DLP), succinic acid peroxide; or benzoyl peroxide. In some embodiments, the polymerization initiator includes 2,2'-azodi-(2,4-dimethylvaleronitrile); 2,2'-azobisisobutyronitrile (AIBN); or 2,2'-azobis(2-methylbutyronitrile). In other embodiments, the polymerization initiator includes di-tert-amyl peroxide (DTAP); di-tert-butylperoxide (DTBP); lauryl peroxide; succinic acid peroxide; or benzoyl peroxide.

The carboxylic acid-functional support polymer is typically an alkali soluble resin. In other words, the carboxylic acid-functional support polymer may react with alkali materials to form ion salts at the carboxylate groups of the polymer, thereby enhancing the water solubility characteristics of the polymer. Suitable carboxylic acid-functional support polymers include, but are not limited to, those prepared from monomers such as acrylic acid, methacrylic acid, itaconic acid, maleic acid, fumaric acid, crotonic acid, acrylic anhydride, methacrylic anhydride, itaconic anhydride, maleic anhydride, fumaric anhydride, crotonic anhydride, styrene, methyl styrene, alpha-methyl styrene, ethyl styrene, isopropyl styrene, tertiary-butyl styrene, ethyl methacrylate, methyl methacrylate, butyl acrylate, butyl methacrylate, 2-ethylhexyl acrylate, ethyl acrylate, vinyl acetate, methyl acrylate, open-chain conjugated dienes, 2-hydroxyethyl methacrylate, 2-hydroxyethyl acrylate, methylol acrylamide, glycidyl acrylate, glycidyl methacrylate, vinyl esters, vinyl chloride, or mixtures of any two or more such monomers. In some embodiments, the carboxylic acid-functional support polymer includes polymerized monomers of ethyl methacrylate, methyl methacrylate, butyl acrylate, butyl methacrylate, 2-ethylhexyl acrylate, ethyl acrylate, vinyl acetate, methyl acrylate, 2-hydroxyethyl methacrylate, 2-hydroxyethyl acrylate, glycidyl acrylate, glycidyl methacrylate, or mixtures of any two or more such monomers. In one embodiment, the carboxylic acid-functional support polymer includes polymerized monomers of acrylic acid, ethyl methacrylate, methyl methacrylate, butyl acrylate, butyl methacrylate, 2-ethylhexyl acrylate, ethyl acrylate, vinyl acetate, methyl acrylate, 2-hydroxyethyl methacrylate, 2-hydroxyethyl acrylate, glycidyl acrylate, glycidyl methacrylate, styrene, methyl styrene, alpha-methyl styrene, or a mixture of any two or more such monomers. In one embodiment, the carboxylic acid-functional support polymer is a co-polymer comprising styrene, methyl methacrylate, and acrylic acid.

The carboxylic acid-functional support polymer will typically have a number average molecular weight of about 500 to 100,000 g/mole. In one embodiment, the number average molecular weight is from about 2,000 to 10,000 g/mole. In one embodiment, the number average molecular weight is from about 500 to 20,000 g/mole. In one embodiment, the number average molecular weight is from about 500 to 5,000 g/mole. Examples of carboxylic acid-functional support polymers, and their preparation may be found in, for example, U.S. Pat. No. 4,820,762.

The carboxylic acid-functional support may have an acid value of greater than about 20. In some embodiments, the acid value is greater than about 30. While an upper limit is not particularly limited, in some embodiments, the acid value may be from about 20 to about 150, or from about 30 to 150.

The keto-functionalized latex polymer described above may be prepared from a number of different keto-functional monomers. For example, the keto-functionalized latex may include monomeric units such as, but not limited to, acrolein, methacrolein, formylstyrene, a compound having (meth) acryloyl group and keto group (e.g., acetyl group) in the molecule, or a vinyl alkyl ketone. For example, such keto-monomers include diacetone acrylamide, diacetone methacrylamide, diacetone acrylate, diacetone methacrylate, acetoacetoxymethyl(meth)acrylate, 2-(acetoacetoxy)ethyl (meth)acrylate, 2-acetoacetoxypropyl(meth)acrylate, butanediol-1,4-acrylate-acetylacetate, vinyl methyl ketone, vinyl ethyl ketone, and vinyl isobutyl ketone, allyl acetoacetate, vinyl acetoacetate, or vinyl acetoacetamide. In one embodiment, the keto-functionalized latex polymer includes diacetone acrylamide.

Illustrative dihydrazides that may be used in the preparation of the emulsions for the inks include those represented by Formula I:

$$H_2N\underset{H}{\overset{\displaystyle O}{\underset{\displaystyle N}{\|}}}\overset{\displaystyle}{R^1}\underset{H}{\overset{\displaystyle O}{\underset{\displaystyle N}{\|}}}NH_2 \qquad I$$

In Formula I, $R^1$ is alkylenyl, cycloalkylenyl, arylenyl, alkylaryl, alkylarylalkyl, heterocyclyleneyl, alkylheterocyclyl, alkylheterocyclylalkyl, heteroarylenyl, alkylheteroaryl, or alkylheteroarylalkyl. In some embodiments, $R^1$ is a substituted or unsubstituted alkylenyl. In some embodiment, $R^1$ is a $C_1$-$C_{20}$ alkyl. One illustrative dihydrazide is adipic dihydrazide.

In the above emulsions, the polycarbodiimide may be represented by Formula II:

$$-\!\!\!+\!\!R^2-N\!\!=\!\!C\!\!=\!\!N\!+\!\!\!\!-_n$$

In Formula II, $R^2$ is alkylenyl, cycloalkylenyl, arylenyl, aralkylenyl, heteroarylenyl, heteroarylalkylenyl, heterocyclylenyl, or heterocylylalkylenyl, or any of the foregoing which optionally includes one or substituents such as CN, $NO_2$, F, Br, Cl, I, sulfides, amines, alkoxy groups, and aryloxy groups. For example, $R^2$ may be a $C_1$-$C_{20}$ alkylenyl, benzylenyl, phenylenyl, or perhalophenylenyl, or in some embodiments, $R^2$ is $C_1$-$C_{10}$ alkylenyl or $C_1$-$C_{20}$ cyloalkylalkylenyl.

Some illustrative compounds of Formula II include where $R^2$ is 2,2,4-trimethylhexamethylene;

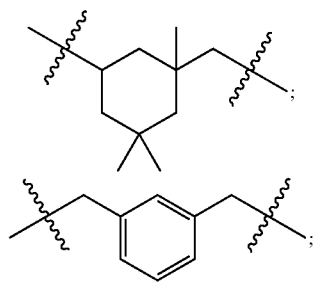

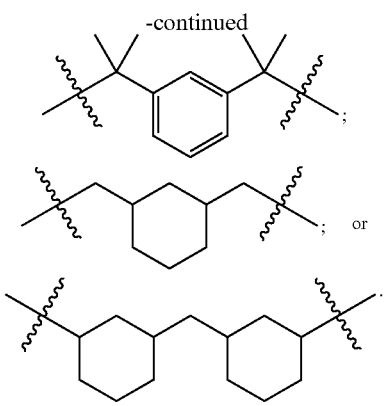

The emulsions may then be applied to a substrate as a coating. For example, the emulsions may also include pigments and/or other additives for use as inks. Suitable substrates include, but are not limited to, paper, cementitious materials, cardboard, fiberboard, wood, plastics, metals, glass, or ceramics.

In another aspect, a process is provided preparing a coating. The process may include mixing a polycarbodiimide with a polymer supported emulsion to form a coating composition. The polymer supported emulsion is any of those as described above and as prepared by charging a neutralized carboxylic acid-functional support polymer dissolved in water to a reactor; charging a (meth)acrylate and a styrenic monomer to the reactor; and charging a keto-functional monomer dissolved in water to the reactor. The neutralized carboxylic acid-functional support polymer, the (meth)acrylate, the styrenic monomer, and the keto-functional monomer are all agitated by stirring, shaking, or other agitation, at a temperature and for a time period sufficient to prepare the cross-linkable support polymer emulsion. Alternatively, a similar process may be conducted, but where the keto-functional monomer is added to the reactor with the initial charge, or after all of the other reactants are charged to the reactor. After the preparation of the emulsion, but prior to the application of the emulsion as a coating or ink to a substrate, the emulsion may be combined with a dihydrazide, and optionally, a base, for curing of the emulsion. The dihydrazide may be added as solution or as a solid.

The (meth)acrylate monomers are those as are described above. For example, suitable (meth)acrylate monomers may include, but are not limited to, acrylic or methacrylic acid, esters of acrylic or methacrylic acid, and salts, amides, and other suitable derivatives of acrylic or methacrylic acid, and mixtures thereof. Examples of suitable acrylic monomers include, without limitation, the following methacrylate esters: methyl methacrylate, ethyl methacrylate, n-propyl methacrylate, n-butyl methacrylate (BMA), isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate (GMA), benzyl methacrylate, allyl methacrylate, 2-n-butoxyethyl methacrylate, 2-chloroethyl methacrylate, sec-butyl-methacrylate, tert-butyl methacrylate, 2-ethylbutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate. Example of suitable acrylate esters include, without limitation, methyl acrylate, ethyl acrylate, n-propyl acrylate, isopropyl acrylate, n-butyl acrylate (BA), n-decyl acrylate, isobutyl acrylate, n-amyl acrylate, n-hexyl acrylate, isoamyl acrylate, 2-hydroxyethyl acrylate, 2-hydroxypropyl acrylate, N,N-dimethylaminoethyl acrylate, N,N-diethylaminoethyl acrylate, t-butylaminoethyl acrylate, 2-sulfoethyl acrylate, trifluoroethyl acrylate, glycidyl acrylate, benzyl acrylate, allyl acrylate, 2-n-butoxyethyl acrylate, 2-chloroethyl acrylate, sec-butyl-acrylate, tert-butyl acrylate, 2-ethylbutyl acrylate, cinnamyl acrylate, crotyl acrylate, cyclohexyl acrylate, cyclopentyl acrylate, 2-ethoxyethyl acrylate, furfuryl acrylate, hexafluoroisopropyl acrylate, methallyl acrylate, 3-methoxybutyl acrylate, 2-methoxybutyl acrylate, 2-nitro-2-methylpropyl acrylate, n-octylacrylate, 2-ethylhexyl acrylate, 2-phenoxyethyl acrylate, 2-phenylethyl acrylate, phenyl acrylate, propargyl acrylate, tetrahydrofurfuryl acrylate and tetrahydropyranyl acrylate.

Illustrative styrenic monomers for use in any of the described processes may include, but are not limited to, styrene and alpha-methylstyrene. Illustrative dihydrazides are also as described above with reference to Formula I. The base may be any of a wide variety of bases including, but not limited to, ammonia, a mono-, di-, or tri-alkyl amine such as, but not limited to methylamine, ethylamine, dimethylamine, diethyl amine, trimethylamine, triethylamine, methyldiethylamine, ethyldimethylamine, pyridine, piperidine, 4-methylpiperidine, diazabicycloundecene, dimethylethanolamine, sodium hydroxide, and potassium hydroxide.

In the above process, the preparation of the polymer supported emulsion may be carried out at room temperature or at elevated temperature. For example, the preparation may be carried out from about 25° C. to about 100° C. In some embodiments, the preparation is carried out from about 50° C. to about 90° C. The time period for the reaction may vary from a few minutes to many hours. In some embodiments, the time period is from about 30 minutes to 4 hours. The reaction may be carried out in a batch reactor or in a continuous reactor.

The above process for preparing a coating may also include mixing a pigment with the polycarbodiimide with the cross-linkable support polymer emulsion. This step may be conducted at a temperature where the kinetics of reaction are favorable for efficient, controllable reaction. For example, the temperature may be above, at, or below room temperature. In one embodiment, the temperature is at or below room temperature. The inks, coatings, and emulsions prepared herein, exhibit stability toward prematurely curing, such that the good resolubility characteristics are maintained. For example, the aqueous coating and ink compositions exhibit a less than 25% increase in viscosity after 5 days of storage under ambient conditions, when stored in a closed vessel. Thus, even with the dual cross-linking system, at ambient conditions, the cross-linking does not progress at an appreciable rate such that the viscosity increases by no more than 25% over 5 days. In some embodiments, the coating or ink compositions exhibit a less than 20% increase in viscosity after 5 days of storage under ambient conditions, when stored in a closed vessel. In some embodiments, the coating or ink compositions exhibit a less than 15% increase in viscosity after 5 days of storage under ambient conditions, when stored in a closed vessel. In some embodiments, the coating or ink compositions exhibit a less than 10% increase in viscosity after 5 days of storage under ambient conditions, when stored in a closed vessel. In some embodiments, the coating or ink compositions exhibit a less than 5% increase in viscosity after 5 days of storage under ambient conditions, when stored in a closed vessel. The smaller the degree of viscosity increase, the longer shelf life the emulsions will exhibit.

The above process for preparing a coating may also include applying the coating composition to a substrate and removing the water to form a coated substrate. The water may be removed from the composition/emulsion at elevated temperature to both aid in drying and aid in curing of the dual cross-link system. The elevated temperature may range from about 30° C. to about 100° C. In some embodiments, the elevated temperature is from about 45° C. to about 70° C. In any of the above embodiments, the elevated temperature may be about 60° C.

In another aspect, a substrate coated with a coating is provided. The coating is based upon any of the above-described dual cross-linkable systems having a cross-linkable keto-functionalized latex polymer and a cross-linkable water-soluble support resin. The substrate that is coated with the coating exhibits a Sutherland rub test score of 4 or greater for a Windex® rubbing. In some embodiments, the coating exhibits a Sutherland rub test score of 5 for a Windex® rubbing. The Sutherland rub tests are further described below in the examples, however simply stated, the test provides a measure of coating integrity and adherence to the substrate. Suitable substrates include, but are not limited to, paper, cardboard, wood, polymers, cement, mortar, cementitious materials, glass, and ceramics. In one embodiment, the substrate comprises polyethylene.

As noted above, the dual cross-linkable emulsions provide for inks which exhibit good resolubility. Resolubility refers to a combination of the transfer, wetting, adhesion and image resolution properties of a composition, manifesting itself in the ability of the printing head to return to the original print quality after a print stop, by resolvating the drying printing ink. The emulsion compositions provided herein allow for improved resolubility over other polymer compositions presently available for use in ink formulations. Resolubility may be measured and quantified by a laboratory gravure printing set-up. Using such a set-up, the measure for resolubility is the number of prints required to regain the original printing image quality after a defined print-stop. Values for resolubility can range from a theoretical low of 1 print on up into the hundred of prints or even more. For the purposes of this disclosure and the claims which follow, the resolubility of a composition is defined in terms of the following "Resolubility Test." The Resolubility Test uses a Moser type flexographic or gravure printing press. After reaching printing equilibrium, the press is stopped for 5 minutes, then restarted and the number of prints needed to reproduce the original printing quality is counted. The press is run at 20 meters per minute. A white polyethylene substrate with a surface tension of 38-42 dyne is used. The water-based ink is printed using a two-roll printing station. The gravure cylinder has 120 lines per cm. The impression roll has a hardness of 750, a shore printing pressure of 1 bar and measured contact area of 9 mm. An in-line Corona treatment of 500 W is used. Printing is done in a climate controlled room maintained at 50% relative humidity and 22° C. Thermostatically controlled drying ovens set at 60° C. are used after the printing station.

As measured according to this Resolubility Test, printing inks made from the above emulsion compositions are capable of restoring at least 95% of original print image quality in 100 prints or fewer. This includes embodiments where printing inks made from the emulsion compositions are capable of restoring at least 95% of original print image quality in 75 prints, or fewer. This includes embodiments where printing inks made from the emulsion compositions are capable of restoring at least 95% of original print image quality in 50 prints, or fewer. This further includes embodiments where printing inks made from the emulsion compositions are capable of completely restoring the original print image quality in less than or equal to 100 prints. This further includes embodiments where printing inks made from the emulsion compositions are capable of completely restoring the original print image quality in from 10 to 80 prints. This further includes embodiments where printing inks made from the emulsion compositions are capable of completely restoring the original print image quality in 5 to 35 prints. This further includes embodiments where printing inks made from the emulsion compositions are capable of completely restoring the original print image quality in 25 to 35 prints.

The present technology, thus generally described, will be understood more readily by reference to the following example, which is provided by way of illustration and is not intended to limit the present technology.

EXAMPLES

Example 1

General Synthesis of DAAM-Functionalized Emulsions Prepared Using RC Emulsions. A solid grade oligomer (SGO; the carboxylic acid functional support polymer which is a water soluble polymer) is added into a reactor with water. The SGO is typically around 30 wt % SGO polymer solids neutralized by ammonia in water. The acid value of the SGO varies from 20-150. The ratio of the SGO solids to total batch solids varies from between 1 wt % to 30 wt %. Diacetone acrylamide (DAAM) is added as a co-feed along with monomers such as styrene and acrylates/methacrylates to the reactor. The ratio of DAAM varies from 0.5% to 5% of total batch solids.

Examples 2A and 2B

Preparation of an SGO solution. Examples 2A and 2B are solutions of an acid functional polymer with different degrees of neutralization (e.g. different levels of ammonia are added).

Example 2A

A co-polymer resin (28.26 g; co-polymer of n-butyl acrylate (14%), styrene (27%), methyl methacrylate (49%) and acrylic acid (10%)) is dissolved in deionized water (70.10 g). The mixture is heated to 60° C., with stirring. To the heated mixture is added a 30 wt % solution of ammonia in water (1.64 g), over a period of 14 minutes, with stirring. The mixture is then heated to 80° C. for 2 hours, until all the resin has dissolved in the water. The resulting SGO resin solution is then cooled to room temperature. The solution is slightly hazy liquid. The resin solution has a solids content of 28.0 wt %; a pH of 7.80; a Tg of 65° C.; and an acid value of 75.

Example 2B

A co-polymer resin (30.00 g; co-polymer of n-butyl acrylate (14%), styrene (27%), methyl methacrylate (49%) and acrylic acid (10%)) is dissolved in deionized water (68.80 g). The mixture is heated to 60° C., with stirring. To the heated mixture is added a 30 wt % solution of ammonia in water (1.40 g), over a period of 14 minutes, with stirring. The mixture is then heated to 80° C. for 2 hours, until all the resin has dissolved in the water. The resulting SGO resin solution is then cooled to room temperature. The solution is slightly hazy liquid with a light pinkish-blue color. The resin solution has a solids content of 30.9 wt %; a pH of 7.30; a Tg of 65° C.; and an acid value of 75.

Examples 3A-3F

Procedures for a Dual Cross-linkable Emulsion System. Examples 3A, 3B, and 3C are emulsion examples having different levels of acid functional polymer in the system using the resin solution of Example 2A above, as a neutralized polymer solution. Examples 3A, 3B, and 3C have 6.73 g, 13.45 g and 20.2 g of the resin of Example 2A, respectively. Examples 3D has a different level of DAAM and ADH, and was synthesized using 3.6 g DAAM and 1.8 g ADH. Example 3E was prepared using a co-polymerizable surfactant ADEKA REASOAP SR-1025 (reactive emulsifier, trade name of Adeka Corp.) along with 13.58 g the resin of Example 2A. Example 3F was prepared using the resin of Example 2B.

Example 3A

A reactor was charged with deionized water (32.10 g), the resin solution from Example 2A (6.73 g), a surfactant [Softanol™ 120 (0.45 g)], and a NaHCO$_3$ solution (10 wt %; 0.09 g). The reactor and mixture was heated to 85° C. In a co-feed vessel, DAAM (1.80 g) and deionized water (9.46 g) are mixed. In a separate monomer feed vessel, styrene (9.0 g) and n-butylacrylate (9.0 g) are mixed. Ammonium persulfate (0.18 g) diluted in deionized water (1.10 g) was added to the reactor followed by simultaneous addition of the co-feed (fed over 55 minutes) and the monomer feed (fed over 60 minutes). Upon completion of the feeds, the vessels were flushed with deionized water (1.50 g for co-feed; and 0.75 g for monomer feed). A second monomer feed of methylmethacrylate (9.0 g), n-butyl acrylate (9.0 g) and water (0.19 g) was then fed to the reactor over 50 minutes. Water (13.56 g), ammonia (0.045 g) and adipic acid dihydrazide (0.90 g) were added, and the mixture cooled to room temperature. A preservative (0.15 g) was added at room temperature. The polymer dispersion was then filtered and collected as a white liquid having a solids content of 39.40 wt %, a pH of about 8.10, and a viscosity of about 100 cps.

Example 3B

A reactor was charged with deionized water (25.38 g), the resin solution from Example 2A (13.45 g), a surfactant [Softanol™ 120 (0.45 g)], and a NaHCO$_3$ solution (10 wt %; 0.09 g). The reactor and mixture was then heated to 85° C. DAAM (1.80 g) and deionized water (9.46 g) are mixed in a co-feed vessel. Styrene (9.0 g) and n-butylacrylate (9.0 g) were mixed in monomer feed vessel. Ammonium persulfate (0.18 g) diluted in deionized water (1.10 g) was added to the reactor followed by simultaneous addition of co-feed (fed over 55 minutes) and monomer feed (fed over 60 minutes). Upon completion of the feeds, the vessels were flushed with deionized water (1.50 g for co-feed; and 0.75 g for monomer feed). A second monomer feed of methylmethacrylate (9.0 g), n-butyl acrylate (9.0 g) and water (0.19 g) was then fed to the reactor over 50 minutes. Water (8.56 g), ammonia (0.045 g) and adipic acid dihydrazide (0.90 g) were added, and the mixture cooled to room temperature. A preservative (0.15 g) was added at room temperature. The polymer dispersion was then filtered and collected as a white liquid having a solids content of 43.08 wt %, a pH of about 7.9, and a viscosity of about 300 cps.

Example 3C

A reactor was charged with deionized water (18.63 g), the B-82 SGO solution from Example 2 (20.20 g), a surfactant [Softanol™ 120 (0.45 g)], and a NaHCO$_3$ solution (10 wt %; 0.09 g). The reactor and mixture was then heated to 85° C. DAAM (1.80 g) and deionized water (9.46 g) were mixed in a co-feed vessel. Styrene (9.0 g) and n-butylacrylate (9.0 g) were mixed in monomer feed vessel. Ammonium persulfate (0.18 g) diluted in deionized water (1.10 g) was added to the reactor followed by simultaneous addition of co-feed (fed over 55 minutes) and monomer feed (fed over 60 minutes). Upon completion of the feeds, the vessels were flushed with deionized water (1.50 g for co-feed; and 0.75 g for monomer feed). A second monomer feed of methylmethacrylate (9.0 g), n-butyl acrylate (9.0 g) and water (0.19 g) was fed to the reactor over 50 minutes. Water (13.56 g), ammonia (0.045 g) and adipic acid dihydrazide (0.90 g) were added, and the mixture cooled to room temperature. A preservative (0.15 g) was added at room temperature. The polymer dispersion was then filtered and collected as a white liquid having a solids content of 42.05 wt %, a pH of about 8.10, and a viscosity of about 2100 cps.

Example 3D

A reactor was charged with deionized water (22.03 g), the B-82 SGO solution from Example 2 (14.11 g), a surfactant [Softanol™ 120 (0.45 g)], and a NaHCO$_3$ solution (10 wt %; 0.09 g). The reactor and mixture was then heated to 85° C. DAAM (1.80 g) and deionized water (9.46 g) were mixed in a co-feed vessel. Styrene (9.0 g) and n-butylacrylate (9.0 g) were mixed in monomer feed vessel. Ammonium persulfate (0.18 g) diluted in deionized water (1.10 g) was added to the reactor followed by simultaneous addition of co-feed (fed over 55 minutes) and monomer feed (fed over 60 minutes). Upon completion of the feeds, the vessels were flushed with deionized water (1.50 g for co-feed; and 0.75 g for monomer feed). A second monomer feed of methylmethacrylate (9.0 g), n-butyl acrylate (9.0 g) and water (0.19 g) was fed to the reactor over 50 minutes. Water (13.56 g), ammonia (0.045 g) and adipic acid dihydrazide (0.90 g) were added, and the mixture cooled to room temperature. A preservative (0.15 g) was added at room temperature. The polymer dispersion was then filtered and collected as a white liquid having a solids content of 41.2 wt %, a pH of about 8.0, and a viscosity of about 300 cps.

Example 3E

A reactor was charged with deionized water (23.58 g), the B-82 SGO solution from Example 2 (13.45 g), a co-polymerizable surfactant Adeka Reasoap SR1025 (0.18 g), a surfactant [Softanol™ 120 (0.45 g)], and a NaHCO$_3$ solution (10 wt %; 0.09 g). The reactor and mixture were then heated to 85° C. DAAM (1.80 g) and deionized water (9.46 g) were mixed in a co-feed vessel. Styrene (9.0 g) and n-butylacrylate (9.0 g) were mixed in monomer feed vessel. Ammonium persulfate (0.18 g) diluted in deionized water (1.10 g) was added to the reactor followed by simultaneous addition of co-feed (fed over 55 minutes) and monomer feed (fed over 60 minutes). Upon completion of the feeds, the vessels were flushed with deionized water (1.50 g for co-feed; and 0.75 g for monomer feed). A second monomer feed of methylmethacrylate (9.0 g), n-butyl acrylate (9.0 g) and water (0.19 g) was fed to the reactor over 50 minutes. Water (13.56 g), ammonia (0.045 g) and adipic acid dihydrazide (0.90 g) were added, and the mixture cooled to room temperature. A preservative (0.15 g) was added at room temperature. The polymer dispersion was then filtered and collected as a white liquid having a solids content of 41.26 wt %, a pH of about 7.6, and a viscosity of about 1000 cps.

Example 3F

Procedure for a Dual Cross-linkable System. A reactor was charged with deionized water (30.08 g), the SGO solution from Example 2B (13.58 g), a surfactant [Softanol™ 120 (0.45 g)], and a NaHCO$_3$ solution (10 wt %; 0.09 g). The reactor and mixture was then heated to 85° C. DAAM (1.817 g) and deionized water (9.545 g) were mixed in a co-feed vessel. Styrene (9.1 g) and n-butylacrylate (9.1 g) were mixed in monomer feed vessel. Ammonium persulfate (0.18 g) diluted in deionized water (1.106 g) was added to the reactor followed by simultaneous addition of co-feed (fed over 55 minutes) and monomer feed (fed over 60 minutes). Upon completion of the feeds, the vessels are flushed with deionized water (1.51 g for co-feed; and 0.76 g for monomer feed). A second monomer feed of methylmethacrylate (9.1 g) and styrene (9.1 g) was fed to the reactor over 50 minutes. After cooling to room temperature, water (3.46 g), ammonia (0.17 g) and adipic acid dihydrazide (0.91 g) are added. The polymer dispersion was then filtered and collected as a white liquid having a solids content of 43.0 wt %, a pH of about 7.8, and a viscosity of about 800 cps.

Example 4

Ink preparation. The DAAM functional emulsion prepared in Example 3F, was blended with a water-based pigment dispersion to prepare an ink. A polycarbodiimide solution (dispersed in water) was then added to the ink before application onto a substrate. The ink is applied on polymer substrate and the film is allowed to cure at room temperature or elevated temperatures. The ink is typically drawn down using a hand proofer on a polypropylene substrate and allowed to dry overnight before testing for resistance properties. The resistance of the cured films are then measured using scrub resistance to Windex® solutions using a Sutherland Rub Test. The emulsion with the added DAAM provided a rating of 3 or greater (from 3-5) due to the dual cure system. Emulsions without PCDI or DAAM give a rating significantly lower than or equal to 3 (ratings between 1-3).

A blue ink was prepared by mixing Flexverse III BGD-3153 blue dispersion (copper phthalocyanine blue 15:3 pigment dispersion from Sun Chemical) with emulsion at ratio 35 to 65 with a high speed disperser for 5 minutes. Then, the ink viscosity was adjusted to 100 mPa·s (cps) diluting with a color dispersion solution (35/65 color dispersion to water). In a separate vessel, a solution of polycarbodiimide (@60% solids) was prepared with water (50/50). The polycarbodiimide solution was then mixed with the ink at a ratio of 100 parts ink to 6 parts polycarbodiimide.

An ink prepared with the above emulsion and with PCDI added, was drawn down on a corona-treated polyethylene film with a flexo hand proofer (360 line) and cured in an oven at 60° C. for 10 minutes.

Example 5

The prints of Example 4 were then subjected to a Sutherland Rub Test and Windex® resistance. For the test, Windex® (5 mL; no dilution) is applied to a Grade 5 bleach cloth that is then fixed over a 2 lb block the Sutherland rub tester, for 15 cycles at a speed #1 setting. The substrate is then rated according to removal of the ink from the substrate. The rating scale is from 1 to 5, with, a 1 indicating that the ink dissolved off of the substrate, a 2 indicates that the ink softened and smeared off, a 3 indicates that the ink scratches and lifts off, a 4 indicates that the ink mars slightly, and a 5 indicates that there was no effect on the ink (excellent result). See FIG. 1 for a the standard panels for the Sutherland rub testing showing the ink removal.

Figure 2:
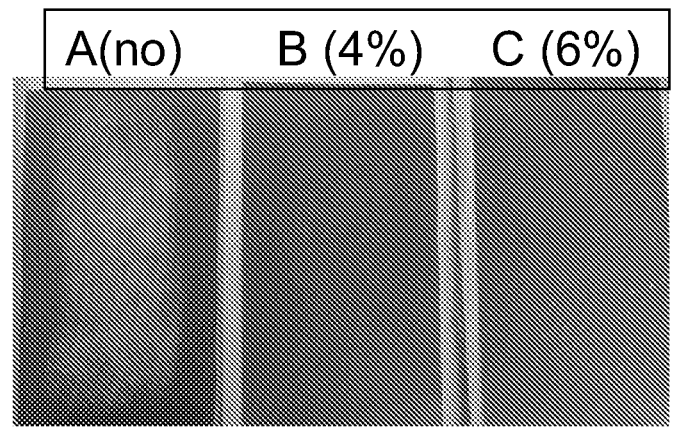
FIG. 2 is a series of the three photographs (A, B, and C) of printed inks prepared using a DAAM functional emulsion with no, 4 wt %, and 6 wt % added polycarbodiimide, illustrating scrub resistance improvement from left to right, according to Example 4.

The films printed with the ink emulsions of Example 4 exhibited a rating of 5, while others sample without the PCDI exhibited a rating of 2. FIG. 2 shows the draw downs of blue prints subjected to Sutherland rub tests, with inks prepared using no added PCDI (A), and those with 4% (B) and 6% (C) added PCDI crosslinker. The addition of the PCDI clearly improves the scrub resistance of the printed ink.

Example 6

Prints were also prepared using a Moser press to determine the resolubility of the ink emulsions. The Moser press may be run in either gravure or flexographic printing formats. For a typical resolubility experiment, the gravure setting is commonly chosen. In the experiment, the Moser press which is equipped with a gravure cylinder, 13.5 cm diameter, and 18.0 cm wide, and the press is run at a speed of 20 meters per minute and oven temperature is 60° C.

Figure 3A:
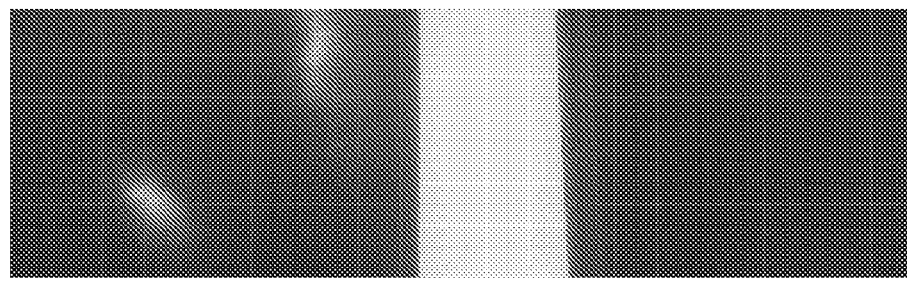
FIG. 3A is a photograph of a cured ink film according to the examples during Moser press testing at the time of 0 prints after the print stop.
Figure 3B:
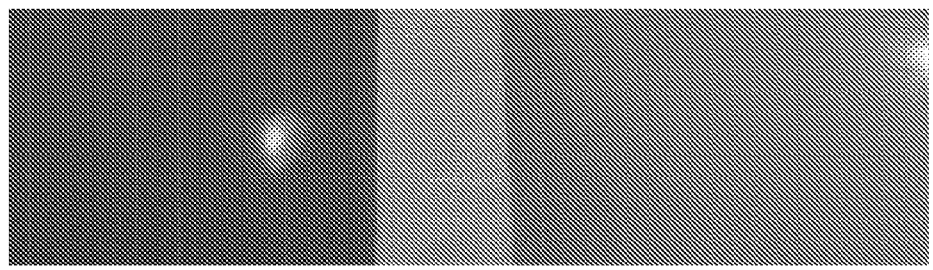
FIG. 3B is a photograph of a cured ink film according to the examples during the Moser press testing after 10 prints.

The resolubility is conducted by counting the number of prints that are needed to recover the original print quality after stopping of the press for five minutes. The print quality was determined by a visual judgment. FIG. 3 is an example of prints after re-start at 1 print (A) and at 10 prints (B). The highlighted area on the print that is the non-immersed area when the press was stopped and examined. It is the area of interest for checking the ability of an ink to recover to its color density prior suspending printing process. The emulsions described above provide a resolubility of less than 30 prints, according to the Moser press trial, while control samples without the dual crosslinking system require greater than 100 prints to return to the original print quality.

TABLE 1

Comparison of DAAM-ADH emulsions with other types of ink cure systems.

| Technology | DAAM/ADH[1] | Control 1[2] | Control 2[2] |
|---|---|---|---|
| Windex ® Resistance[3] | 5 | 1 | 5 |
| Moser Press Trial | | | |
| Resolubility[4] | <30 | >100 | >100 |
| Ink stability[5] % viscosity change in 5 days | 0% | 45% | 81% |

[1]DAAM-ADH is the ink prepared in Example 4 in a drawn down film, 4 μm wet thickness.
[2]See Table 3, below.
[3]Resistance to a drawn down ink as measured by Sutherland Rub Testing on a scale of from 1-5.
[4]Resolubility is measured by Moser print testing, where the number is the number of prints after a timed stop to return to full run print quality.
[5]Ink stability is reported as a % viscosity change after 5 days.

TABLE 2

Composition of Control Ink Emulsions

|  | Control 1 (%) | Control 2 (%) |
|---|---|---|
| % Solids | 48.9 | 48.9 |
| Dispersing resin and pigment | 19.6 | 19 |
| Latex polymer | 27.5 | 26.7 |
| PCDI | 5.1 | 0.0 |
| Aziridine | 0 | 2.9 |
| Di(propylene glycol) dimethyl ether | 3.4 | 0.0 |
| Water | 44.4 | 51.4 |
| Total | 100.0 | 100.0 |
| Total solid | 55.6 | 48.6 |

EQUIVALENTS

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

While certain embodiments have been illustrated and described, it should be understood that changes and modifications can be made therein in accordance with ordinary skill in the art without departing from the technology in its broader aspects as defined in the following claims.

What is claimed is:

1. A water-based coating composition comprising:
   a continuous phase comprising water and a carboxylic acid-functional support polymer;
   a polycarbodiimide;
   an keto-functionalized latex polymer; and
   a dihydrazide; and
   wherein:
      the water-based coating composition undergoes a less than 25% increase in viscosity after 5 days of storage in a closed container under ambient conditions; and
      the carboxylic acid-functional support polymer is an alkali soluble resin.

2. The water-based coating composition of claim 1, wherein the carboxylic acid-functional support polymer comprises polymerized monomers comprising acrylic acid, methacrylic acid, itaconic acid, maleic acid, fumaric acid, crotonic acid, acrylic anhydride, methacrylic anhydride, itaconic anhydride, maleic anhydride, fumaric anhydride, crotonic anhydride, styrene, methyl styrene, alpha-methyl styrene, ethyl styrene, isopropyl styrene, tertiary-butyl styrene, ethyl methacrylate, methyl methacrylate, butyl acrylate, butyl methacrylate, 2-ethylhexyl acrylate, ethyl acrylate, vinyl acetate, methyl acrylate, open-chain conjugated dienes, 2-hydroxyethyl methacrylate, 2-hydroxyethyl acrylate, methylol acrylamide, glycidyl acrylate, glycidyl methacrylate, vinyl esters, or vinyl chloride.

3. The water-based coating composition of claim 1, wherein the carboxylic acid-functional support polymer comprises polymerized monomers selected from the group consisting of acrylic acid, ethyl methacrylate, methyl methacrylate, butyl acrylate, butyl methacrylate, 2-ethylhexyl acrylate, ethyl acrylate, vinyl acetate, methyl acrylate, 2-hydroxyethyl methacrylate, 2-hydroxyethyl acrylate, glycidyl acrylate, glycidyl methacrylate and mixtures of any two or more thereof.

4. The water-based coating composition of claim 1, wherein the carboxylic acid-functional support polymer comprises polymerized monomers selected from the group consisting of ethyl methacrylate, methyl methacrylate, butyl acrylate, butyl methacrylate, 2-ethylhexyl acrylate, ethyl acrylate, vinyl acetate, methyl acrylate, 2-hydroxyethyl methacrylate, 2-hydroxyethyl acrylate, glycidyl acrylate, glycidyl methacrylate and mixtures of any two or more thereof.

5. The water-based coating composition of claim 1, wherein the carboxylic acid-functional support polymer is a co-polymer comprising styrene, methyl methacrylate, butyl acrylate and acrylic acid.

6. The water-based coating composition of claim 1, wherein the carboxylic acid-functional support polymer has a number average molecular weight of about 500 to 100,000 g/mole.

7. The water-based coating composition of claim 6, wherein the carboxylic acid-functional support polymer has a number average molecular weight of about 500 to 20,000 g/mole.

8. The water-based coating composition of claim 1, wherein the keto-functionalized latex polymer comprises acrolein, methacrolein, formylstyrene, a compound having a (meth)acryloyl group and a keto group in the molecule, or a vinyl alkyl ketone.

9. The water-based coating composition of claim 1, wherein the keto-functionalized latex polymer comprises diacetone acrylamide, diacetone methacrylamide, diacetone acrylate, diacetone methacrylate, acetoacetoxymethyl (meth)acrylate, 2-(acetoacetoxy)ethyl(meth)acrylate, 2-acetoacetoxypropyl(meth)acrylate, butanediol-1,4-acrylate-acetylacetate, vinyl methyl ketone, vinyl ethyl ketone, and vinyl isobutyl ketone, allyl acetoacetate, vinyl acetoacetate, or vinyl acetoacetamide.

10. The water-based coating composition of claim 1, wherein the dihydrazide is a compound of Formula I:

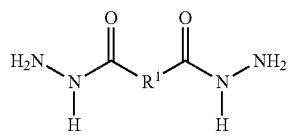

I wherein: $R^1$ is alkylene, cycloalkylene, arylene, alkylenearylene, alkylenearylalkylene, heterocyclylene, alkyleneheterocyclylene, alkyleneheterocyclylalkylene, heteroarylene, alkyleneheteroarylene, or alkyleneheteroarylalkylene.

11. The water-based coating composition of claim 1, wherein the dihydrazide is adipic dihydrazide.

12. The water-based coating composition of claim 1, wherein the repeat unit of the polycarbodiimide is represented by Formula:

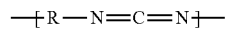

wherein: R is alkylenyl, arylenyl, aralkylenyl, heteroarylenyl, heteroarylalkylenyl, heterocyclylenyl, or heterocylylalkylenyl.

13. The water-based coating composition of claim 12, wherein R is $C_1$-$C_{20}$ alkylenyl, benzylenyl, phenylenyl, or perhalophenylenyl.

14. The water-based coating composition of claim 12, wherein R is 2,2,4-trimethylhexamethylene;

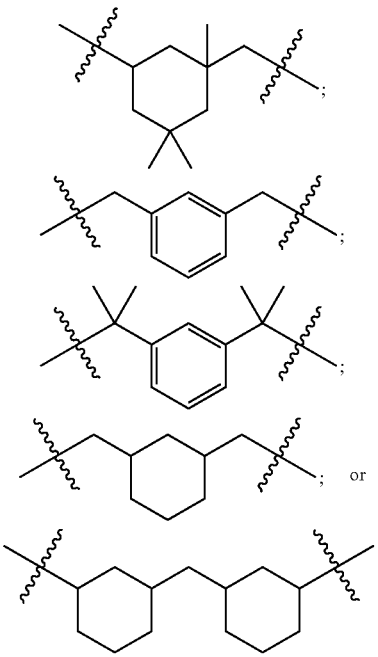

15. The water-based coating composition of claim 1, wherein the composition is an ink.

16. A process for preparing a water-based coating composition comprising:
  mixing a polycarbodiimide with a cross-linkable polymer supported emulsion to form a ink composition;
  wherein:
    the cross-linkable polymer supported emulsion is prepared by a second process, the second process comprising:
      charging a neutralized carboxylic acid-functional support polymer dissolved in water to a reactor;
      charging a (meth)acrylate and a styrenic monomer to the reactor;
      charging a keto-functionalized monomer dissolved in water to the reactor;
      charging a dihydrazide dissolved in water to the reactor; and
      charging a base to the reactor; and
      agitating the neutralized carboxylic acid-functional support polymer, the (meth)acrylate, the styrenic monomer, the keto-functionalized monomer, the dihydrazide, and the base at a temperature and for a time period sufficient to prepare the cross-linkable polymer supported emulsion.

17. The process of claim 16 further comprising: applying the water-based ink composition to a substrate and removing the water to form an ink-coated substrate.

* * * * *